United States Patent
Oikawa et al.

(10) Patent No.: US 10,198,318 B2
(45) Date of Patent: Feb. 5, 2019

(54) STORAGE APPARATUS HAVING NONVOLATILE MEMORY DEVICE, AND NONVOLATILE MEMORY DEVICE

(71) Applicant: Hitachi, Ltd., Tokyo (JP)

(72) Inventors: Yoshihiro Oikawa, Yokohama (JP); Hiroshi Hirayama, Tokyo (JP); Kenta Ninose, Tokyo (JP)

(73) Assignee: HITACHI, LTD., Tokyo (JP)

( * ) Notice: Subject to any disclaimer, the term of this patent is extended or adjusted under 35 U.S.C. 154(b) by 199 days.

(21) Appl. No.: 15/509,732

(22) PCT Filed: Oct. 27, 2014

(86) PCT No.: PCT/JP2014/078445
§ 371 (c)(1),
(2) Date: Mar. 8, 2017

(87) PCT Pub. No.: WO2016/067328
PCT Pub. Date: May 6, 2016

(65) Prior Publication Data
US 2017/0308722 A1    Oct. 26, 2017

(51) Int. Cl.
*G06F 3/06* (2006.01)
*G06F 11/10* (2006.01)
(Continued)

(52) U.S. Cl.
CPC .......... *G06F 11/1076* (2013.01); *G06F 3/064* (2013.01); *G06F 3/0619* (2013.01);
(Continued)

(58) Field of Classification Search
CPC ................. G06F 3/06–3/0689; G06F 11/0727
See application file for complete search history.

(56) References Cited

U.S. PATENT DOCUMENTS 8,429,346 B1 * 4/2013 Chen ...................... G06F 3/0613
709/213
8,447,915 B2 * 5/2013 Araki .................. G06F 12/0246
365/185.3
(Continued)

FOREIGN PATENT DOCUMENTS

JP      2010-108246 A      5/2010
JP      2012-247848 A     12/2012

OTHER PUBLICATIONS

International Search Report and Written Opinion for PCT App No. PCT/JP2014/078445 dated Dec. 16, 2014, 11 pgs.

*Primary Examiner* — Nathan Sadler
(74) *Attorney, Agent, or Firm* — Procopio, Cory, Hargreaves & Savitch LLP

(57) ABSTRACT

A nonvolatile memory device includes: a nonvolatile memory including a plurality of physical blocks; and a memory controller configured to execute an internal process of migrating data between physical blocks. The memory controller is configured to select, based on an update frequency level which is identified with respect to a logical address range from a higher-level apparatus, a physical block to be allocated to the logical address range from among the plurality of physical blocks. The memory controller is configured to determine, in the internal process, whether to set a migration destination level (an update frequency level of a migration destination physical block) to a same level as or a different level from a migration source level (an update frequency level of a migration source physical block) based on whether or not an attribute of the migration source physical block satisfies a prescribed condition.

14 Claims, 10 Drawing Sheets

(51) Int. Cl.
    *G06F 12/02*          (2006.01)
    *G06F 12/00*          (2006.01)
    *G06F 12/16*          (2006.01)
    *G06F 21/78*          (2013.01)

(52) U.S. Cl.
    CPC .......... *G06F 3/0649* (2013.01); *G06F 3/0685* (2013.01); *G06F 12/00* (2013.01); *G06F 12/0246* (2013.01); *G06F 12/16* (2013.01); *G06F 21/78* (2013.01); *G06F 2212/7211* (2013.01)

(56) References Cited

U.S. PATENT DOCUMENTS

| | | | |
|---|---|---|---|
| 2007/0294492 A1* | 12/2007 | Rudelic | G06F 3/061 |
| | | | 711/156 |
| 2008/0104343 A1* | 5/2008 | Miyagaki | G06F 3/0613 |
| | | | 711/158 |
| 2010/0064111 A1* | 3/2010 | Kunimatsu | G06F 12/08 |
| | | | 711/161 |
| 2010/0115183 A1 | 5/2010 | Araki et al. | |
| 2011/0264843 A1 | 10/2011 | Haines et al. | |
| 2012/0254513 A1 | 10/2012 | Uehara et al. | |
| 2015/0205689 A1* | 7/2015 | Chiu | G06F 3/0605 |
| | | | 714/47.2 |
| 2017/0351602 A1* | 12/2017 | Oshimi | G11C 16/0475 |

\* cited by examiner

| Byte \ Bit | 7 | 6 | 5 | 4 | 3 | 2 | 1 | 0 |
|---|---|---|---|---|---|---|---|---|
| 0 | OPERATION CODE (2Ah) | | | | | | | |
| 1 | Reserved | | | DPO | FUA | Reserved | FUA_NV | Obsolete |
| 2 | (MSB) | | | | | | | |
| 3 | LOGICAL BLOCK ADDRESS | | | | | | | |
| 4 | | | | | | | | |
| 5 | | | | | | | | (LSB) |
| 6 | Reserved | | | | GROUP NUMBER | | | |
| 7 | (MSB) | | | TRANSFER LENGTH | | | | |
| 8 | | | | | | | | (LSB) |
| 9 | Vendor Specific | | Reserved | | | NACA | Obsolete | Obsolete |

[Vendor Specific]
  00: Normal Write / 01: Hot Data Write / 10: Cold Data Write / 11: Reserved

STORAGE APPARATUS HAVING NONVOLATILE MEMORY DEVICE, AND NONVOLATILE MEMORY DEVICE

CROSS-REFERENCE TO RELATED APPLICATIONS

This application is a U.S. National Stage entry of PCT Application No. PCT/JP2014/078445, filed on Oct. 27, 2014. The contents of the foregoing are incorporated by reference.

TECHNICAL FIELD

The present invention generally relates to lifetime control of a nonvolatile memory.

BACKGROUND ART

Generally, a flash memory is composed of a plurality of physical blocks and an upper limit is set to the number of erasures (the number of writes) of each physical block. A flash memory device including a flash memory performs memory lifetime control (leveling of the number of erasures) which is called wear leveling.

Storage apparatuses including a flash memory device and a storage controller that is a higher-level apparatus of the flash memory device are known. For example, in PTL 1, a storage controller notifies a flash memory device of an update frequency level and the flash memory device performs wear leveling based on the update frequency level from the storage controller. Update frequency levels include "hot" which is a level signifying that update frequency is comparatively high and "cold" which is a level signifying that update frequency is comparatively low. For example, hot data (data with high update frequency) is aggregated in one physical block. An update frequency level is determined by the storage controller based on an update frequency or based on whether or not data is parity data.

CITATION LIST

Patent Literature

[PTL 1]
US 2012/0254513 A1

SUMMARY OF INVENTION

Technical Problem

After a flash memory device receives a command, an update frequency level at the time of reception of the command may be changed. However, in PTL 1, no consideration is given to a change in an update frequency level after the flash memory device is notified of the update frequency level.

For example, when the flash memory device is notified of hot from the storage controller with respect to a certain logical address range, a young block (a physical block of which the number of erasures is comparatively small) is desirably allocated to the logical address range. However, when, despite the update frequency level of the logical address range being changed from hot to cold, the logical address range is configured to be allocated a young block even in subsequent allocations, factors such as a shortage of young blocks prevent appropriate wear leveling from being performed and shorten the lifetime of the memory.

Problems of this type may also occur in a case where, after the flash memory device is notified of "cold" from the storage controller with respect to a certain logical address range, the update frequency level of the logical address range is changed from cold to hot. In addition, problems of this type may also occur in other types of nonvolatile memory devices including a nonvolatile memory composed of a plurality of physical blocks, each physical block having an upper limit to the number of erasures (the number of writes).

Solution to Problem

A nonvolatile memory device includes: a nonvolatile memory including a plurality of physical blocks; and a memory controller configured to execute a read process of reading data from the nonvolatile memory in response to a read command from a higher-level apparatus, a write process of writing data to the nonvolatile memory in response to a write command from the higher-level apparatus, and an internal process which is a different process from the read process and the write process and which involves migrating data between physical blocks. The memory controller is configured to select, based on an update frequency level which is identified with respect to a logical address range from the higher-level apparatus, a physical block to be allocated to the logical address range from among the plurality of physical blocks. The memory controller is configured to determine, in the internal process, whether or not a migration destination level (an update frequency level of a migration destination physical block) is to be set to a same level as a migration source level (an update frequency level of a migration source physical block) based on whether or not an attribute of the migration source physical block satisfies a prescribed condition.

Advantageous Effects of Invention

According to the present invention, appropriate wear leveling of a nonvolatile memory can be performed.

DESCRIPTION OF EMBODIMENT

Figure 1:
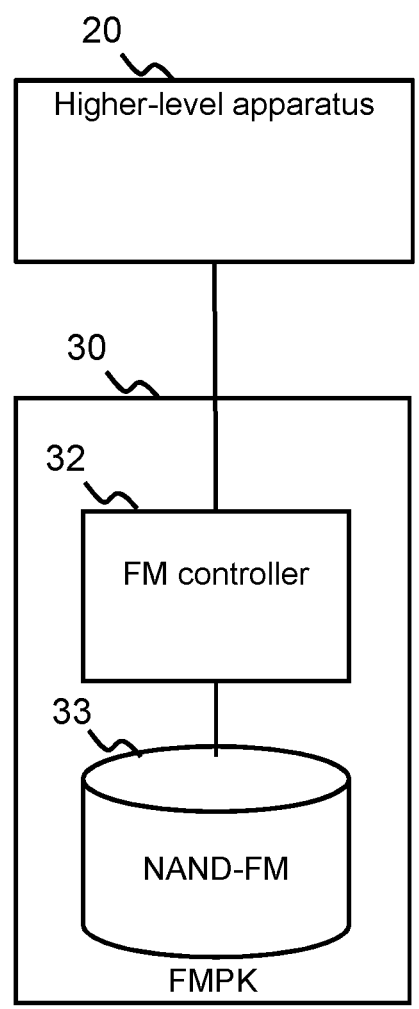
FIG. 1 is a diagram for explaining an outline of an embodiment.

Hereinafter, an embodiment will be described with reference to the drawings.

Although various types of information will be described below using expressions such as a "kkk table" and a "kkk queue", various types of information may be expressed by data structures other than a table. At least one of a "kkk table" and a "kkk queue" can be referred to as "kkk information" in order to show that information is not dependent on data structure.

In addition, in the following description, while identification numbers are used as identification information of various targets, identification information of types other than identification numbers (for example, identifiers including alphabetical characters or symbols) can also be adopted.

Furthermore, while a "program" is sometimes used as a subject when describing a process in the following description, since a program causes a prescribed process to be performed by appropriately using a storage resource (such as a memory) and/or a communication interface device (such as a communication port) when being executed by a processor (such as a CPU (Central Processing Unit)), a "processor" (or an apparatus such as a controller which includes the processor) may be used instead as a subject of a process. Conversely, a process having a processor (or an apparatus such as a controller which includes the processor) as its subject can be interpreted to be performed by executing one or more programs. Furthermore, a processor may include a hardware circuit which performs a part of or all of the processes to be performed by the processor. A computer program may be installed to each computer from a program source. The program source may be, for example, a program distribution server or a storage medium.

In addition, in the following description, a communication interface device may be abbreviated to "I/F".

Furthermore, while a flash memory device including a flash memory (hereinafter, a flash memory package will be abbreviated to "FMPK") will be used as an example of a nonvolatile memory device including a nonvolatile memory in the following description, a nonvolatile memory device including a nonvolatile memory device of another type (for example, a semiconductor memory such as an MRAM (Magnetoresistive Random Access Memory) that is a magnetoresistive memory, a ReRAM (Resistance Random Access Memory) that is a resistance change memory, or an FeRAM (Ferroelectric Random. Access Memory) that is a ferroelectric memory) can also be adopted instead of a flash memory device.

In addition, in the following description, "LU" is an abbreviation of a logical unit and can also be referred to as a logical volume. An LU is a logical storage device. An LU may be a real LU (RLU) or a virtual LU (VLU). Furthermore, an LU may be an online LU provided in an external apparatus (for example, a host 10 to be described later) which is coupled to a storage apparatus providing the LU. An "RLU" is an LU based on a physical storage resource (for example, a RAID (Redundant Array of Independent (or Inexpensive) Disks) group that is composed of a plurality of PDEVs) included in a storage apparatus that provides the RLU. PDEV is an abbreviation of a nonvolatile physical storage device. A "VLU" is an LU which is composed of a plurality of virtual chunks (virtual storage areas) and which is in accordance with capacity virtualization technology (typically, thin provisioning). A real chunk (a real storage area) is allocated to a VLU from a pool. A "pool" is a storage area which is composed of a plurality of real chunks and which is based on one or more PDEVs of a same type or different types.

In addition, in the following description, update frequency levels of a logical address range include at least hot and cold. Hot signifies that the update frequency is comparatively high and cold signifies that the update frequency is comparatively low. A "logical address range with a comparatively high update frequency" may be a logical address range of which the update frequency is equal to or larger than a first frequency threshold or may be a logical address range of which the update frequency is included in the top P percent (where 0<P<100) among a plurality of logical address ranges. A "logical address range with a comparatively low update frequency" may be a logical address range of which the update frequency is smaller than the first frequency threshold (or smaller than a second frequency threshold that is smaller than the first frequency threshold) or a logical address range of which the update frequency is included in the bottom Q percent (where Q is a numerical value equal to or smaller than 100−P) among a plurality of logical address ranges. Moreover, update frequency levels may include a third level which is neither hot nor cold. The third level may be, for example, an intermediate level between hot and cold.

Furthermore, in the following description, physical blocks include at least old blocks and young blocks. An old block is a physical block of which the number of erasures is comparatively (typically, relatively) large. A young block is a physical block of which the number of erasures is comparatively (typically, relatively) small. A "physical block of which the number of erasures is comparatively large" may be a physical block of which the number of erasures is equal to or larger than a first number threshold or a physical block of which the number of erasures is included in the top V percent (where 0<V<100) among a plurality of physical blocks. A "physical block of which the number of erasures is comparatively small" may be a physical block of which the number of erasures is smaller than the first number threshold (or smaller than a second number threshold that is smaller than the first number threshold) or a physical block of which the number of erasures is included in the bottom W percent (where W is a numerical value equal to or smaller than 100−V) among a plurality of physical blocks. The first number threshold (and the second number threshold) may be a variable value which varies according to an average value or the like or the numbers of erasures of a plurality of physical blocks. Moreover, while physical blocks may also include a block of a third type which is neither an old block nor a young block, the following description assumes that physical blocks include two types of blocks: old and young.

FIG. 1 is a diagram for illustrating an outline of an embodiment.

A flash memory package (hereinafter, an FMPK) 30 includes a NAND flash memory (hereinafter, a NAND-FM) 33 and a flash memory controller (hereinafter, an FM controller) 32 coupled to the NAND-FM 33. The FMPK 30 is an example of a nonvolatile memory device, the NAND-FM 33 is an example of a nonvolatile memory, and the FM controller 32 is an example of a memory controller. The FMPK 30 is, for example, an SSD (Solid State Drive).

The NAND-FM 33 includes a plurality of physical blocks (not shown) as physical storage areas. The FM controller 32 reads data from the NAND-FM 33 and writes data to the NAND-FM 33. Specifically, the FM controller 32 is configured to be capable of executing a read process of reading data from the NAND-FM 33 in response to a read command from a higher-level apparatus 20, a write process of writing data to the NAND-FM 33 in response to a write command from the higher-level apparatus 20, and an internal process of migrating data between physical blocks. The internal process is a different process from the read process and the write process.

The higher-level apparatus 20 identifies at least one of an attribute (for example, at least one of a usage purpose and an access pattern to be described later) of a logical address range and an update frequency level which is determined based on the attribute. A logical address range is a part of a logical space (a logical address space) provided by the FMPK 30. The higher-level apparatus 20 may manage each LU or each real chunk as a logical address range or may manage an address range of an LU or an address range (for example, an LBA (Logical Block Address) range) of a real chunk as a higher-level address range (an address range recognized by the higher-level apparatus 20) and manage a correspondence between the higher-level address range and a logical address range. The higher-level apparatus 20 transmits a logical address range and update level information (information indicating an attribute of the logical address range or an update frequency level determined based on the attribute) to the FMPK 30.

The FM controller 32 of the FMPK 30 receives the logical address range and the update level information from the higher-level apparatus 20. The FM controller 32 selects, based on an update frequency level identified from the update level information, a physical block to be allocated to the received logical address range from among a plurality of physical blocks. For example, when the identified update frequency level is hot, the FM controller 32 selects a young block, and when the identified update frequency level is cold, the FM controller 32 selects an old block. The selected physical block is allocated to the logical address range by the FM controller.

Even when update level information is not received from the higher-level apparatus 20, when the FM controller 32 performs the internal process, the FM controller 32 determines, in the internal process, whether to set a migration destination level (an update frequency level of a migration destination physical block) to a same level as or a different level from an update frequency level of a migration source physical block based on whether or not an attribute of the migration source physical block satisfies a prescribed condition. For example, when the attribute of the migration source physical block satisfies a prescribed condition, the FM controller 32 sets the migration destination level to cold even when the update frequency level of the migration source physical block is hot. Accordingly, the physical block selected as the migration destination physical block in the internal process is an old block.

As described above, according to the present embodiment, the internal process triggers a review by the FM controller 32 of the update frequency level of a logical address range corresponding to data in a migration source physical block.

Accordingly, when, after the FM controller 32 receives update level information on a certain logical address range from the storage controller 20, the update frequency level of the logical address range is changed, the changed update frequency level of the logical address range can be detected by the FM controller 32 without transmitting update level information in accordance with the changed update frequency level from the storage controller 20 to the FM controller 32. Therefore, a physical block of an appropriate type can be allocated and, as a result, appropriate wear leveling can be performed.

Hereinafter, the present embodiment will be described in detail.

Figure 2:
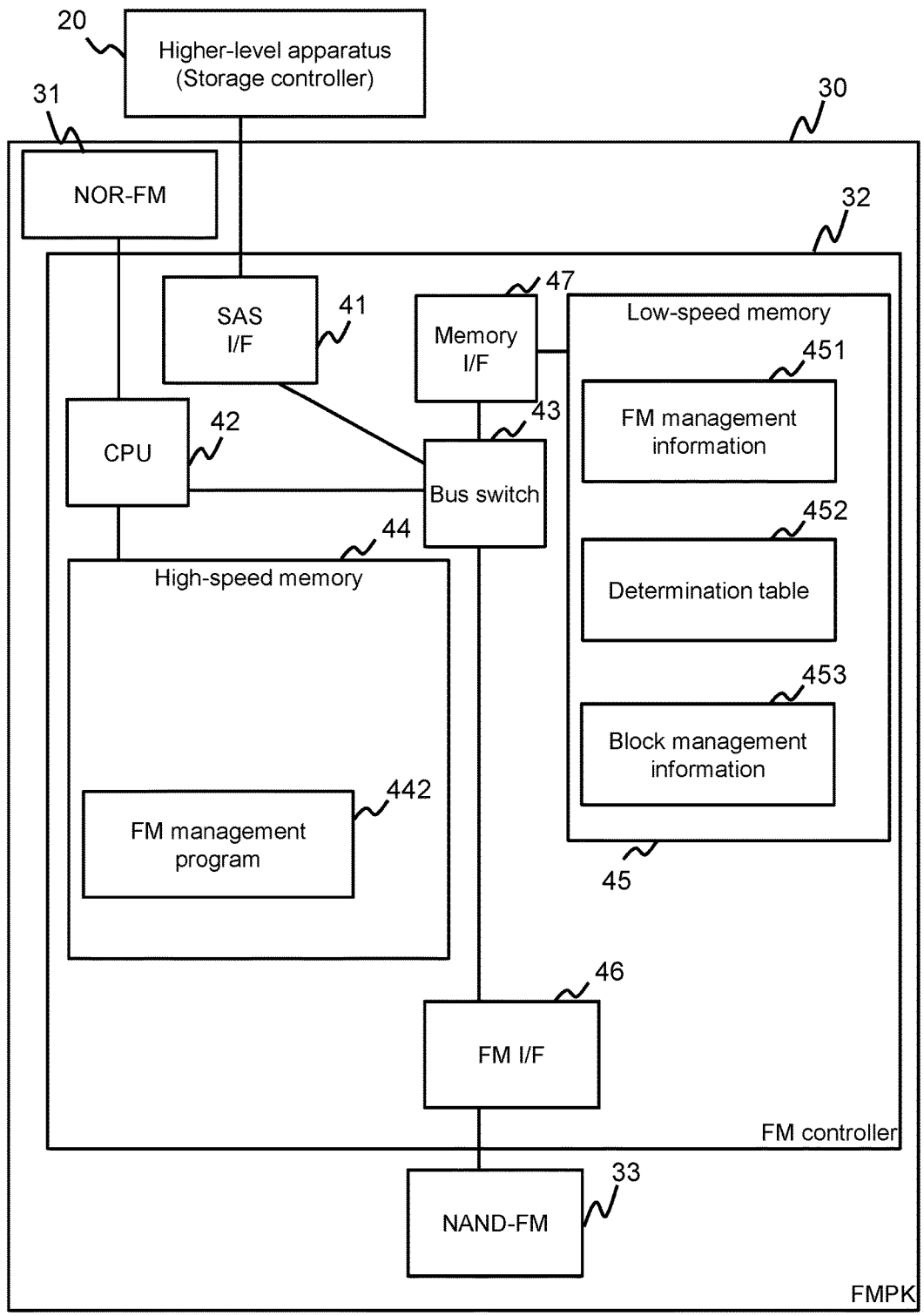
FIG. 2 shows a configuration example of an FMPK.

FIG. 2 shows a configuration example of the FMPK 30.

The FMPK 30 includes a NOR flash memory (hereinafter, a NOR-FM) 31, the FM controller 32, and the NAND-FM 33.

The NOR-FM 31 stores at least one of a program executed by a CPU 42 and information used by the CPU 42. The NAND-FM 33 includes one or more NAND-FM chips. The NAND-FM chip may be an SLC (Single Level Cell) type chip or an MLC (Multi Level Cell) type chip. Data is stored in the NAND-FM 33 in accordance with a write request issued by the FM controller 32 having received a write command from the higher-level apparatus 20. Each of the one or more NAND-FM chips includes a plurality of physical blocks (not shown), and each of the plurality of physical blocks is composed of a plurality of physical pages (not shown). With the NAND-FM 33, data is read and written in page units and erased in block units. In addition, the NAND-FM 33 is a so-called recordable memory and does not allow data to be overwritten into a page. Update data of data written in a page is written into a different empty page. In each physical block, a write destination of data sequentially shifts from a top empty page to an end empty page. A physical block with an empty page at the end is a so-called block being written (an open block). In addition to empty pages, physical pages include valid pages and invalid pages. A valid page is a physical page storing valid data and an invalid page is a physical page storing invalid data. Valid data refers to latest data regarding a corresponding logical address range and invalid data refers to old data having been updated by valid data.

The FM controller 32 includes the CPU 42, an SAS (Serial Attached SCSI) I/F 41, a bus switch 43, a memory I/F 47, a low-speed memory 45, a high-speed memory 44, and an FM I/F 46.

The SAS I/F 41 is a communication interface device which is coupled to the higher-level apparatus 20 and which mediates data communication between the higher-level apparatus 20 and parts on a side of the bus switch 43. The SAS I/F 41 performs data communication with the higher-level apparatus 20 in accordance with SAS. While the higher-level apparatus 20 is, for example, a storage controller to be described later, the higher-level apparatus 20 may be a computer such as a PC (Personal Computer) instead of a storage controller.

The bus switch 43 is coupled to the CPU 42, the SAS I/F 41, the memory I/F 47, and the FM I/F 46 and relays data among these parts.

The memory I/F 47 is a communication interface device which is coupled to the low-speed memory 45 and which controls input and output of data to and from the low-speed memory 45.

The low-speed memory 45 is, for example, a DRAM (Dynamic Random Access Memory) or a nonvolatile memory and stores various types of data and the like to be used in processes performed by the CPU 42. The low-speed memory 45 stores FM (Flash Memory) management information 451, a determination table 452, and block management information 453.

The FM management information 451 stores information necessary for managing the NAND-FM 33. The FM management information 451 may include logical-physical translation information representing a correspondence between a logical address (for example, an LBA) and a physical address (for example, a PBA). In addition, the FM management information 451 may include, for example, the number of young blocks, the number of old blocks, or the like.

The determination table 452 shows a correspondence between a range of logical addresses (LBAs) and an update frequency level. Sets of a logical address range and an update frequency level are registered in the determination table 452. The update frequency level to be registered in the table 452 may be an update frequency level indicated by update level information from the higher-level apparatus 20 or an update frequency level identified by the FM controller 32 based on a logical address range attribute indicated by the update level information.

Figure 3:
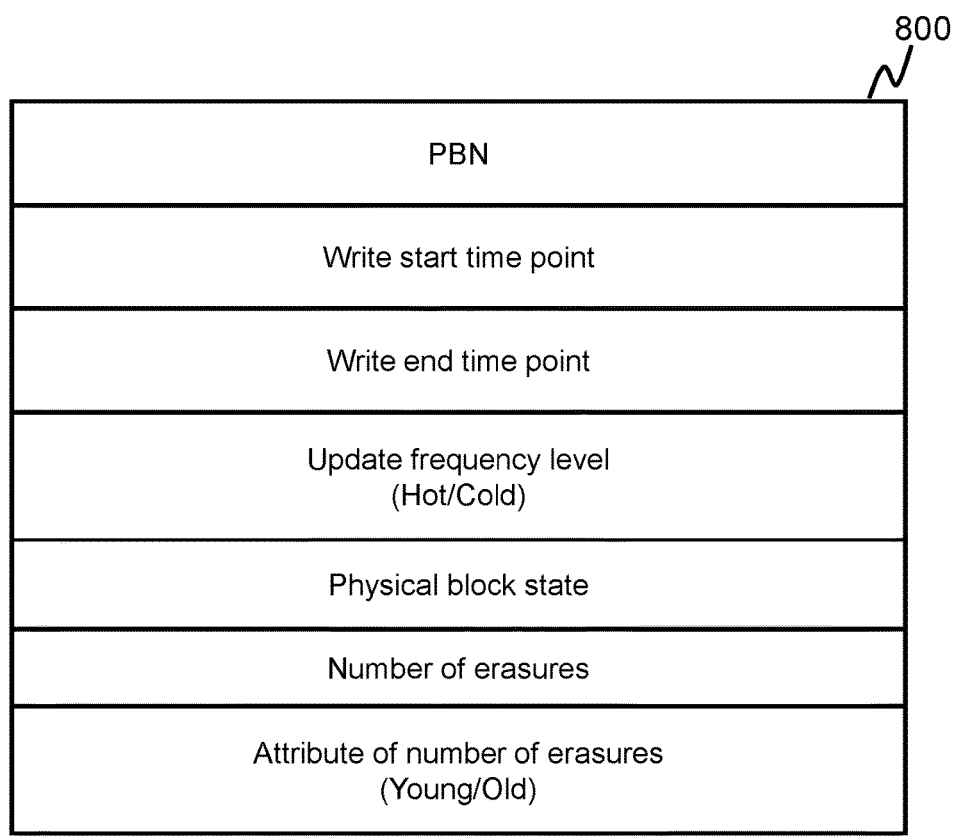
FIG. 3 shows a configuration example of a block management entry.

The block management information 453 includes information related to each physical block and includes, for example, a block management entry (for example, a file or a record of a table) 800 for each physical block. As shown by the example in FIG. 3, each block management entry 800 includes a PBN (the number of a corresponding physical block), a write start time point (a time point at which data is written into a top page), a write end time point (a time point at which data is written into an end page), a physical block state (empty, defective, or the like), an update frequency level (an update frequency level associated with a physical block corresponding to the information unit), the number of erasures, and an attribute of the number of erasures (young or old). The attribute of the number of erasures may be updated as appropriate by a FM control program 442 in accordance with the number of erasures after update. In addition, when data is erased from a physical block (when an erase process is performed on a physical block), the update frequency level in the block management entry 800 corresponding to the physical block is also erased by the FM controller 32.

The high-speed memory 44 is, for example, an SRAM (Static Random Access Memory) and is directly coupled to the CPU 42. The high-speed memory 44 stores a program to be executed by the CPU 42 and the like. In the present embodiment, the high-speed memory 44 stores a flash memory control program (hereinafter, a FM control program) 442.

The FM control program 442 executes the write process, the read process, and the internal process described earlier.

The FM I/F 46 is a communication interface device which is coupled to the NAND-FM 33 and which controls input and output of data to and from the NAND-FM 33.

The configuration of the FMPK 30 is not limited to the configuration shown in FIG. 2. For example, the NOR-FM 31 may be omitted and the program or information in the NOR-FM 31 may be stored in at least one of the high-speed memory 44 and the low-speed memory 45. In addition, instead of a plurality of memories with different performances such as the high-speed memory 44 and the low-speed memory 45, one or more memories with a same performance may be adopted.

Figure 4:
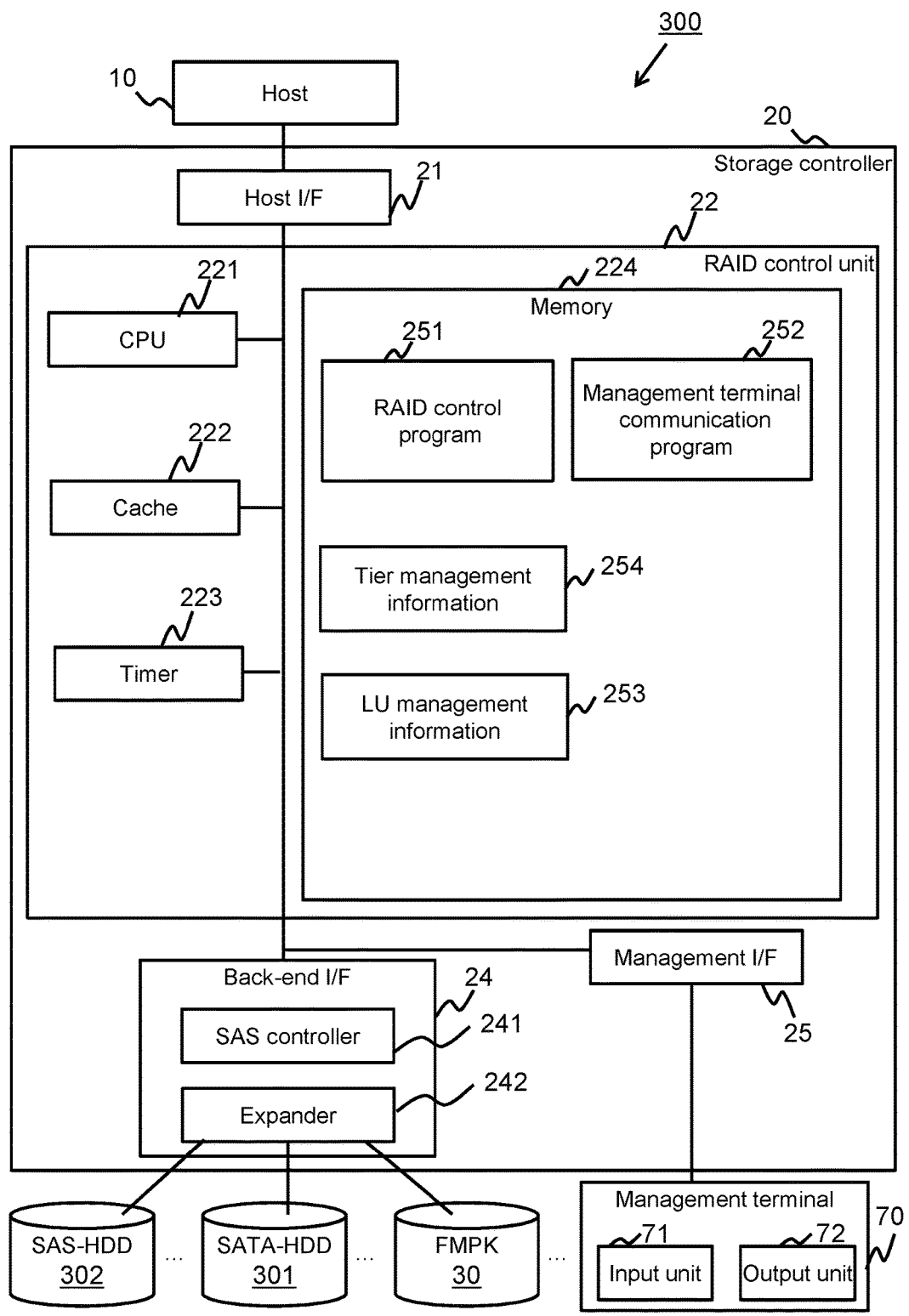
FIG. 4 shows a configuration example of a storage apparatus according to an embodiment.

FIG. 4 shows a configuration example of a storage apparatus according to the embodiment.

A storage apparatus 300 includes the storage controller 20 as an example of the higher-level apparatus 20, the FMPK 30, an SAS-HDD 302, and an SATA (Serial ATA)-HDD 301. There may be one or more of at least one of the FMPK 30, the SAS-HDD 302, and the SATA-HDD 301. The present embodiment may include a RAID group composed of a plurality of the FMPKs 30, a RAID group composed of a plurality of the SAS-HDDs 302, and a RAID group composed of a plurality of the SATA-HDDs 301.

The storage controller 20 includes a host I/F 21, a RAID control unit 22, a management I/F 25, and a back-end interface device (a back-end I/F) 24.

The host I/F 21 is a communication interface device which mediates exchange of data between a host computer (hereinafter, a host) 10 and the storage controller 20. The host 10 performs input and output of data to be used in processes to and from the storage controller 20.

The management I/F 25 is a communication interface device which mediates exchange of data to and from a management terminal 70. The management terminal 70 is a computer and includes an input unit (for example, a keyboard and a pointing device) (not shown) for receiving an input from a user (for example, a manager) and an output unit (for example, a display device) (not shown) for outputting (typically, displaying) information to the user. The input unit 71 and the output unit 72 may be integrated as in the case of a touch panel.

The back-end I/F 24 mediates exchange of data among PDEVs such as the FMPK 30, the SAS-HDD 302, and the SATA-HDD 301. The back-end I/F 24 includes an SAS controller 241 and an SAS expander (hereinafter, an expander) 242. The expander 242 is an example of a switch device and is capable of being coupled to a plurality of PDEVs (30, 301, and 302), and mediates exchange of data between the SAS controller 241 and the PDEVs. The SAS controller 241 performs data communication with the PDEVs in accordance with SAS. The storage controller 20 and the PDEVs may communicate with each other in accordance with a protocol other than SAS (for example, PCIe (PCI-Express)).

The RAID control unit 22 performs control for accessing the PDEVs from the host 10. The RAID control unit 22 includes a CPU 221, a cache memory 222, a timer 223, and a memory 224.

The cache memory 222 caches data input and output to and from the PDEVs. The timer 223 measures a lapse of time. The CPU 221 executes various processes by using programs and data stored in the memory 224.

The memory 224 stores programs to be executed by the CPU 221 and data to be used by the CPU 221. Specifically, the memory 224 stores a RAID control program 251 for performing RAID control on a RAID group, a management terminal communication program 252 for communicating with the management terminal 70, LU management information 253, and tier management information 254. The LU management information 253 includes, for each LU, an LU ID (for example, an LU number), an LU type (RLU or VLU), a capacity, and an LU definition (for example, a usage purpose, an access type, and an access pattern). The tier management information 254 includes, for each VLU and for each virtual chunk, an access frequency and an address of an allocated real chunk. The access frequency of a virtual chunk may include both a frequency of a first type which is updated in either case of read or write and a frequency of a second type (an update frequency) which is updated only in a case of write.

The RAID control program 251 is capable of providing the host 10 with an LU such as an RLU and a VLU. The RAID control program 251 issues a command to the FMPK 30 via the back-end I/F 24. In addition, the RAID control program 251 manages an access frequency for each virtual chunk of a VLU using tier management information 254. The RAID control program allocates a real chunk from a pool to a write destination virtual chunk in a VLU. A pool has a tiered structure.

Figure 5:
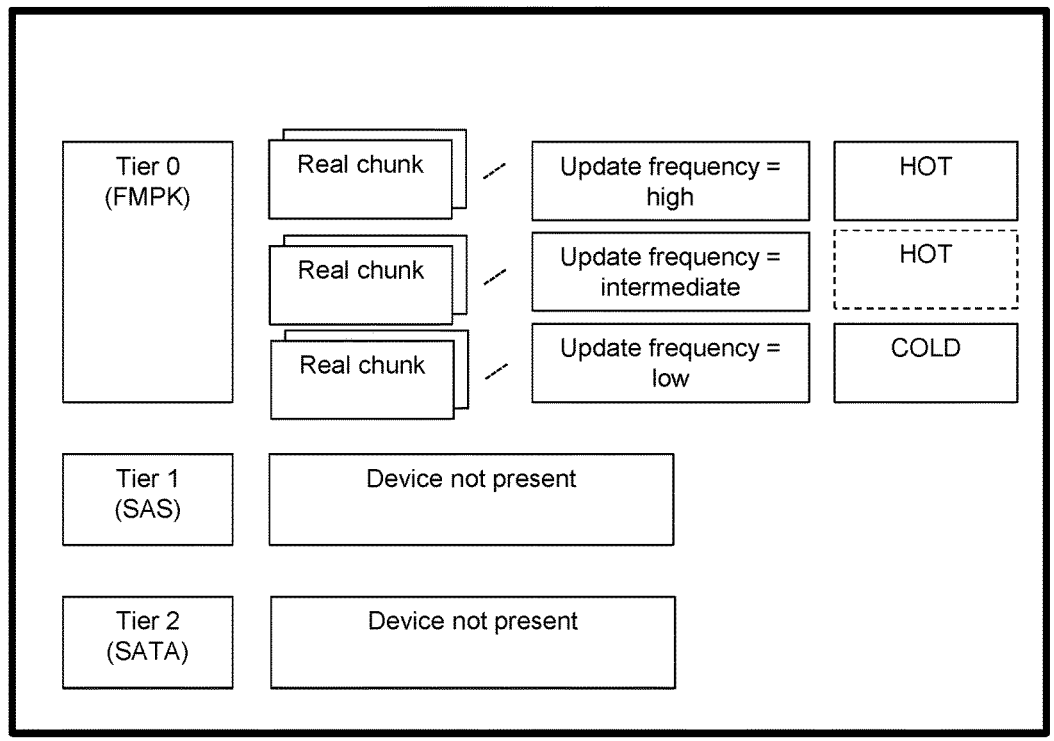
FIG. 5 is a schematic diagram of a pool tier structure.

FIG. 5 is a schematic diagram of a pool tier structure.

The pool includes a plurality of tiers. A tier is classified based on a type (access performance) of a PDEV that forms a basis of a real chunk. For example, a tier 0 is a set of real chunks based on the FMPK 30, a tier 1 is a set of real chunks based on the SAS-HDD 302, and a tier 2 is a set of real chunks based on the SATA-HDD 301. Moreover, in the example shown in FIG. 5, the present embodiment is not provided with the tiers 1 and 2 and only includes the tier 0.

Figure 6:
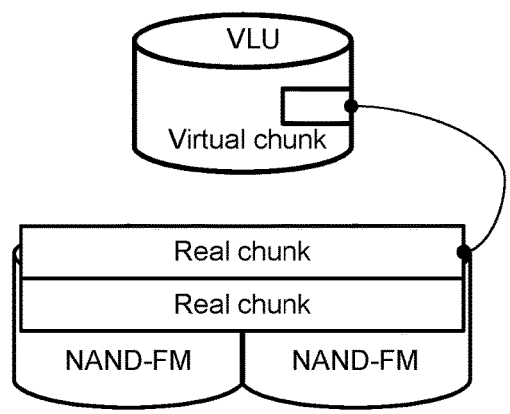
FIG. 6 shows an example of a relationship between a real chunk and an FMPK.

In this manner, when at least a tier based on a PDEV other than the FMPK 30 is not present (alternatively, a tier based on a PDEV other than the FMPK 30 such as the tiers 1 and 2 may be present), as shown in FIG. 5, the tier 0 based on the FMPK 30 may be logically divided into a plurality of tiers. Specifically, for example, the tier 0 is logically divided into a first internal tier which is a set of real chunks allocated to virtual chunks with an update frequency of "high", a second internal tier which is a set of real chunks allocated to virtual chunks with an update frequency of "intermediate", and a third internal tier which is a set of real chunks allocated to virtual chunks with an update frequency of "low". An update frequency of "high" is an update frequency which is equal to or larger than a first frequency threshold, an update frequency of "low" is an update frequency which is smaller than a second frequency threshold that is smaller than the first frequency threshold, and an update frequency of "intermediate" is an update frequency which is smaller than the first frequency threshold and equal to or larger than the second frequency threshold. The concept of the update frequency of "intermediate" may be omitted. Moreover, for example, since a real chunk is based on two or more FMPKs 30 which constitute a RAID group as shown in FIG. 6, an address range of one real chunk may correspond to two or more logical address ranges respectively corresponding to two or more FMPKs 30. The address range of one real chunk may have a same size as a logical address range of one FMPK 30. A size of a real chunk may be equal to or larger than a size of a physical block.

With respect to an LBA belonging to a logical address range corresponding to a real chunk allocated to a virtual chunk with an update frequency of "high", the RAID control program 251 transmits a write command including update level information indicating the update frequency of "high" or an update frequency level of "hot" (an update frequency level determined based on the update frequency of "high") to the FMPK 30 corresponding to the logical address range. Upon receiving the update level information, the FM controller 32 (the FM control program 442) of the FMPK 30 performs one of (H1) and (H2) described below:
(H1) a young block is allocated to the LBA, and hot is associated with the young block (specifically, an update frequency level of "hot" is recorded in the block management entry 800 corresponding to the young block); and
(H2) an empty page in a physical block which is associated with hot and which includes an empty page is allocated to the LBA. (H2) enables a situation where hot data (data corresponding to a logical address range associated with hot) and cold data (data corresponding to a logical address range associated with cold) coexist in one physical block to be avoided and, therefore, a reduction in WA (Write Amplification) can be expected. WA corresponds to the number of writes of one piece of data. For example, when data X is written into the NAND-FM 33 in accordance with a write command from the higher-level apparatus 20 and subsequently written into the NAND-FM 33 by two internal processes, since the data X is written three times, WA is 3. A high WA signifies that a same piece of data has been written into the NAND-FM 33 the number of times indicated by the numerical value of WA, which signifies shortening of the lifetime of the NAND-FM 33. Therefore, WA is desirably reduced in order to extend the lifetime. When hot data and cold data coexist in one physical block, valid data continues to remain in the physical block even when a certain period of time elapses (specifically, for example, even when a certain period of time elapses after a write start time point or a write end time point of the physical block) and, consequently, migration of the valid data in the internal process such as a reclamation process must be performed. As a result, WA increases. On the other hand, when only hot data is aggregated in one physical block, all the data become invalid data within a certain period of time and, consequently, data migration is not required. As a result, WA decreases. Such effects can be expected from (H2) described above. Moreover, the FM controller 32 (the FM control program 442) may prioritize (H2) between (H1) and (H2). For example, when receiving update level information from which an update frequency level of "hot" is identified, the FM controller 32 (the FM control program 442) may determine whether or not there is a physical block which is associated with hot and which includes an empty page. The FM controller 32 (the FM control program 442) may execute (H2) when a result of the determination is positive and execute (H1) when the result of the determination is negative. Accordingly, a depletion of empty blocks (physical blocks in which all physical pages are empty pages) due to an increase in blocks being written can be prevented.

In addition, with respect to an LBA belonging to a logical address range corresponding to a real chunk allocated to a virtual chunk with an update frequency of "low", the RAID control program 251 transmits a write command including update level information indicating the update frequency of "low" or an update frequency level of "cold" (an update frequency level determined based on the update frequency of "low") to the FMPK 30 corresponding to the logical address range. Upon receiving the update level information, the FM controller 32 (the FM control program 442) of the FMPK 30 performs one of (L1) and (L2) described below:
(L1) an old block is allocated to the LBA, and cold is associated with the old block (specifically, an update frequency level of "cold" is recorded in the block management entry 800 corresponding to the old block); and
(L2) an empty page in a physical block which is associated with cold and which includes an empty page is allocated to the LBA. WA reduction (non-necessity of data migration) such as described above is expected from (L2). Moreover, the FM controller 32 (the FM control program 442) may prioritize (L2) between (L1) and (L2). For example, when receiving update level information from which an update frequency level of "cold" is identified, the FM controller 32 (the FM control program 442) may determine whether or not there is a physical block which is associated with cold and which includes an empty page. The FM controller 32 (the FM control program 442) may execute (L2) when a result of the determination is positive and execute (L1) when the result of the determination is negative. Accordingly, a depletion of empty blocks (physical blocks in which all physical pages are empty pages) due to an increase in blocks being written can be prevented.

Furthermore, with respect to an LBA belonging to a logical address range corresponding to a real chunk allocated to a virtual chunk with an update frequency of "intermediate", the RAID control program 251 transmits an ordinary write command (a write command not including update level information) to the FMPK 30. When receiving the ordinary write command, the FM controller 32 (the FM control program 442) of the FMPK 30 may perform (H1) or (H2) described earlier. In other words, a young block is used for an LBA specified by an ordinary write command. Since a young block is a block with a low lifetime degradation level, even when an update frequency thereof increases, an adverse effect to extending lifetime is small. Moreover, instead of an ordinary write command, a write command including update level information indicating the update frequency of "intermediate" or an update frequency level of "hot" (an update frequency level determined based on the update frequency of "intermediate") may be transmitted to the FMPK 30.

Figures 7, 8:
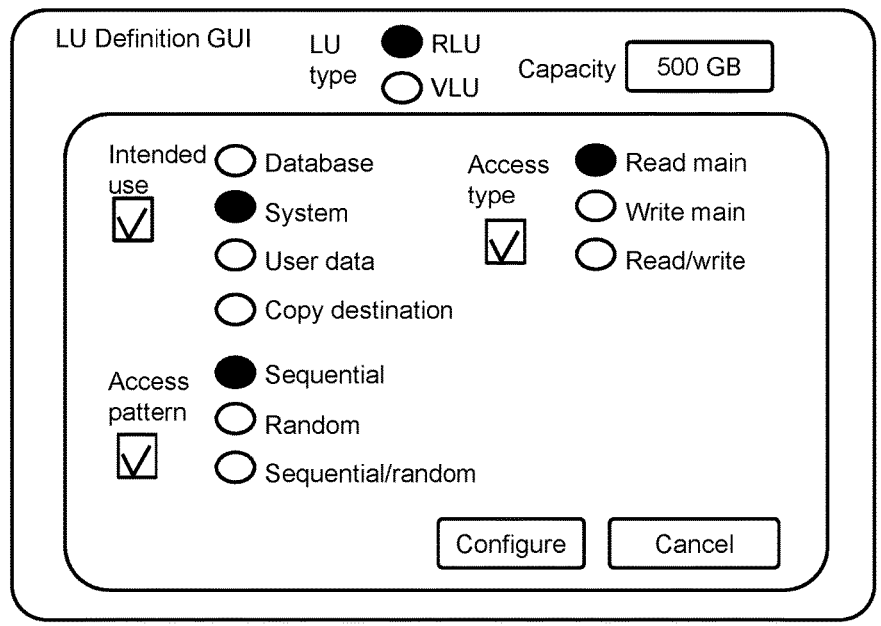
FIG. 7 shows a format of a write command from a storage controller to an FMPK.
FIG. 8 shows an example of an LU definition GUI.

FIG. 7 shows a format of a write command from the storage controller 20 to the FMPK 30.

The storage controller 20 transmits a write command having, as a write destination, an LBA to which a logical address range corresponding to a real chunk allocated to a virtual chunk belongs to the FMPK 30 corresponding to the logical address range for the purpose of, for example, destaging from the cache memory 222. In an implementation of the present embodiment, any of normal, hot, and cold can be specified in the Vendor Specific field located at the 6th and 7th bits of the 9th byte of a SCSI-standard write command. Normal is a value used for an update frequency of "intermediate". The format of the present command is merely an example and other formats may be adopted. For example, any of normal, hot, and cold can be specified in a field other than the Vendor Specific field. In addition, for example, a separate OPERATION CODE may be respectively recorded in a write command in which hot is recorded and a command in which cold is recorded. In the present embodiment, a command in which "normal" is recorded is an ordinary write command and a command in which hot or cold is recorded is a write command including update level information.

In this manner, every time a write command is received, the FM controller 32 can learn about an update frequency level of an LBA specified in the write command or, more specifically, a latest update frequency level. The FM controller 32 may register a logical address range to which the LBA in the write command belongs and an update frequency level identified from the update level information in the write command in the determination table 452. When an update frequency level for the logical address range is already registered in the determination table 452, the registered update frequency level may be updated by the update frequency level identified from the update level information in the write command.

Furthermore, in the present embodiment, the storage controller 20 can notify the FMPK 30 of an update frequency level (or a logical address range attribute) using a command that differs from a write command. For example, when an attribute of a certain real chunk in the tier 0 is changed or the like, the storage controller 20 transmits, to the FMPK 30, a notification command including a logical address range corresponding to the real chunk and update level information indicating an attribute after the change or an update frequency level determined from the attribute. The FM controller 32 registers the logical address range in the notification command and an update frequency level identified from the update level information in the notification command in the determination table 452. Moreover, when an update frequency level for the logical address range is already registered in the determination table 452, the registered update frequency level may be updated by the update frequency level identified from the update level information in the notification command. Accordingly, the FM controller 32 is able to learn about a change in the update frequency level of a real chunk (for example, a change in the attribute of the real chunk) despite not receiving a write command due to the non-occurrence of an update of the real chunk.

The storage controller 20 can provide the host 10 with an RLU in addition to a VLU. A definition an LU is performed from, for example, the management terminal 70 through the management I/F 25. The management terminal communication program 252 provides the management terminal 70 with a GUI (Graphical User Interface), and a definition of an LU is received from an operator (a user) of the management terminal 70 through the GUI. The GUI is an example of a user interface. A user interface of another type may be adopted in place of the GUI.

FIG. 8 shows an example of an LU definition GUI.

According to the example shown in FIG. 8, the GUI is configured to receive an LU type (VLU or RLU) and a capacity (a capacity of the LU). In addition, according to the example shown in FIG. 10, items (types) of a definition associated with an LU (for example, a VLU or an RLU) include a usage purpose, an access type, and an access pattern. The GUI is configured so as to be capable of receiving, from the user, whether or not a specification is to be made for each of at least one definition item among the usage purpose, the access type, and the access pattern (for example, the GUI includes a GUI component such as a check box). In addition, the GUI is configured so as to be capable of receiving, from the user, a selection of an option for each of at least one definition item among the usage purpose, the access type, and the access pattern (for example, the GUI includes a GUI component such as a radio button). Depending on an option selected for a certain definition item, the management terminal communication program 252 may cause the user to select an option for a different definition item which corresponds to the selected option.

Examples of options for the usage purpose of an LU include a database, a system, user data, and a copy destination. In addition, examples of options for the access type of an LU include read main, write main, and read/write. Furthermore, examples of options for the access pattern of an LU include sequential, random, and sequential/random. Based on an LU definition (an option selected for each of at least one of the usage purpose, the access type, and the access pattern) input via the GUI, the storage controller 20 (or the FM controller 32) can determine an update frequency level for the entire LU. The input LU definition is registered in, for example, the memory 224 in association with an LU ID such as an LU number. The input LU definition is an example of a logical address range attribute. In the case of an RLU, a logical address range corresponding to an entire area of the RLU is an example of a logical address range of the FMPK 30. While the storage controller 20 manages a plurality of LUs, since the FMPK 30 does not perform access management for each LU, an access pattern for each LU cannot be recognized and a random access pattern may be recognized as a whole. However, in the present embodiment, since an LU attribute is determined using information specified by the user, LUs with a same access pattern can be readily aggregated in a same physical unit. Accordingly, WA can be reduced and favorable wear leveling can be performed. Moreover, normally, when the user determines a storage capacity and a method of use thereof, the user performs design in consideration of the usage purpose, the access type, and the access pattern exemplified in FIG. 10.

Therefore, conceivably, it is comparatively easy to configure the usage purpose and the like of an LU from the GUI when performing the design.

For example, a user-friendly specification of an LU definition may involve at least receiving a selection of an option for the usage purpose or, specifically, for example, receiving a selection of an option for the usage purpose and receiving a selection of an option for a different definition item (a definition item specified by the user or a definition item automatically specified by the option selected for the usage purpose) (in other words, for example, subdivision of usage purpose). An update frequency level can be determined based on the specified LU definition.

Hereinafter, a specific example of a correspondence between an LU definition and an update frequency level determined from the LU definition will be described. While a usage purpose, an access pattern, and the like are defined in LU units in this example, an address range in a partial area of an LU may be specified and a usage purpose, an access pattern, and the like may be defined for the partial area. In addition, while the determination of an update frequency level based on an LU definition is performed by the storage controller 20 (for example, the management terminal communication program 252) in the present embodiment, information including an LU definition and a logical address range corresponding to an LU for which the LU definition is specified may be notified from the storage controller 20 to the FM controller 32 of the FMPK 30 corresponding to the logical address range, and the FM controller 32 may determine an update frequency level to be associated with a physical block based on the LU definition and the logical address range contained in the information.

<Definition Item: Usage Purpose of LU>

Option: Database

A database which is hardly updated or, in other words, a read main database is a set of cold data (data with a low update frequency).

In this manner, with respect to the option "database", the update frequency level conceivably depends on an access type. Therefore, when "database" is selected as the usage purpose, the storage controller 20 causes the user to select an option for the access type and, based on the option selected for the access type, determines an update frequency level of an LU for which the LU definition is specified.

Option: System

Typically, the option "system" is selected when the LU is used as a system area. When the LU is a system area but is only used upon startup, for example, the LU is conceivably an OS (Operating System) area and is therefore mainly sequentially accessed. As a result, data in the LU is conceivably cold data. In addition, when the LU is a swap area (an area used as a virtual address) used by the OS, the LU is conceivably mainly randomly accessed and, therefore, a large number of partial updates occur. As a result, data in the LU is conceivably hot data. Furthermore, when the LU is a cache area (for example, data which cannot be written into the memory 224 in the storage controller 20 but must be acquired via a network can be acquired at high speed by placing the data in the FMPK 30) that is used by the OS, conceivably the LU is not frequently updated and, therefore, mainly sequentially accessed. As a result, data in the LU is conceivably cold data.

Therefore, when "system" is selected as the usage purpose, the storage controller 20 causes the user to select an option for the access type (or causes the user to select an option (a subdivided usage purpose) prepared for the option "system"), and determines an update frequency level of an LU for which the LU definition is specified based on the selected option (an option for the access type or an option prepared for the option "system").

Option: User Data

When "user data" is selected as the usage purpose, the storage controller 20 causes the user to select an option for the access type and, based on the option selected for the access type, determines an update frequency level of an LU for which the LU definition is specified.

Option: Copy Destination

An example of a case where an LU becomes a copy destination is when the LU is a secondary LU (a replica LU) which is paired with a primary LU. Conceivably, a secondary LU is exclusively created for backup which is a batch operation. An update frequency level of cold is desirably determined for an LU created for such a purpose. An old block is desirably allocated to a logical address range corresponding to such an LU.

By periodically copying a difference between the secondary LU and the primary LU to the secondary LU (by performing periodical resynchronization), contents of the secondary LU and the primary LU can be made the same. In this case, conceivably, an update frequency of the secondary LU is lower than an update frequency of the primary LU and, therefore, data in the secondary LU is comparatively cold data (data that is not updated frequently enough to correspond to hot but is nevertheless updated). Favorably, an update frequency level of the secondary LU also takes a period of resynchronization into consideration.

The secondary LU conceivably stores data that is mainly sequentially accessed.

As described above, the update frequency of the secondary LU conceivably varies depending on the period of resynchronization and the like.

Therefore, when "copy destination" is selected as the usage purpose, the storage controller 20 causes the user to select an option for the access type (or causes the user to specify a resynchronization period or causes the user to select an option for an update frequency or a detailed usage purpose) and, based on the selected option (or the specified resynchronization period), the storage controller 20 determines an update frequency level of an LU for which the LU definition is specified. For example, when the update frequency is identical or similar to that of a copy source LU, hot may be determined as the update frequency level. When the update frequency is sufficiently lower than that of the copy source LU, cold may be determined as the update frequency level. When the copy destination LU is to be used for mirroring of the copy source LU, hot may be determined as the update frequency level. When the copy destination LU is to be used as a snapshot of the copy source LU, cold may be determined as the update frequency level.

<Definition Item: Access Type>

Option: Read Main

When "read main" is selected as the access type, the storage controller 20 determines cold as an update frequency level of an LU for which the LU definition is specified.

Option: Write Main

When "write main" is selected as the access type, the storage controller 20 determines hot as an update frequency level of an LU for which the LU definition is specified.

Option: Read/Write

When "read/write" is selected as the access type, the storage controller 20 determines hot as an update frequency level of an LU for which the LU definition is specified.

<Definition Item: Access Pattern>
Option: Sequential

When "sequential" is selected as the access pattern, the storage controller 20 determines cold as an update frequency level of an LU for which the LU definition is specified.

Option: Random

When "random" is selected as the access pattern, the storage controller 20 determines hot as an update frequency level of an LU for which the LU definition is specified.

Option: Sequential/Random

When "sequential/random" is selected as the access pattern, the storage controller 20 determines hot as an update frequency level of an LU for which the LU definition is specified.

When the LU definition described above is for an RLU, for example, the update frequency level determined based on the LU definition may be associated with each of one or more physical blocks allocated to a logical address range (a logical address range of one or more FMPKs 30) corresponding to an entire area of the RLU. When the LU definition described above is for a VLU, for example, the update frequency level determined based on the LU definition may be associated with each of one or more physical blocks allocated to a logical address range (a logical address range of one or more FMPKs 30) corresponding to a real chunk allocated to an initial virtual chunk (a virtual chunk to which a real chunk has not yet been allocated) and, subsequently, the update frequency level associated with each of one or more physical blocks allocated to a logical address range corresponding to a real chunk allocated to the virtual chunk may be updated in accordance with an access frequency of the virtual chunk. In addition, even when a plurality of LUs (for example, RLUs) with different usage purposes coexist in a same FMPK 30, wear leveling may be performed by the FM controller 32 between physical blocks corresponding to LUs with a same update frequency level (for example, "hot").

Hereinafter, processes performed in the present embodiment will be described.

Figure 9:
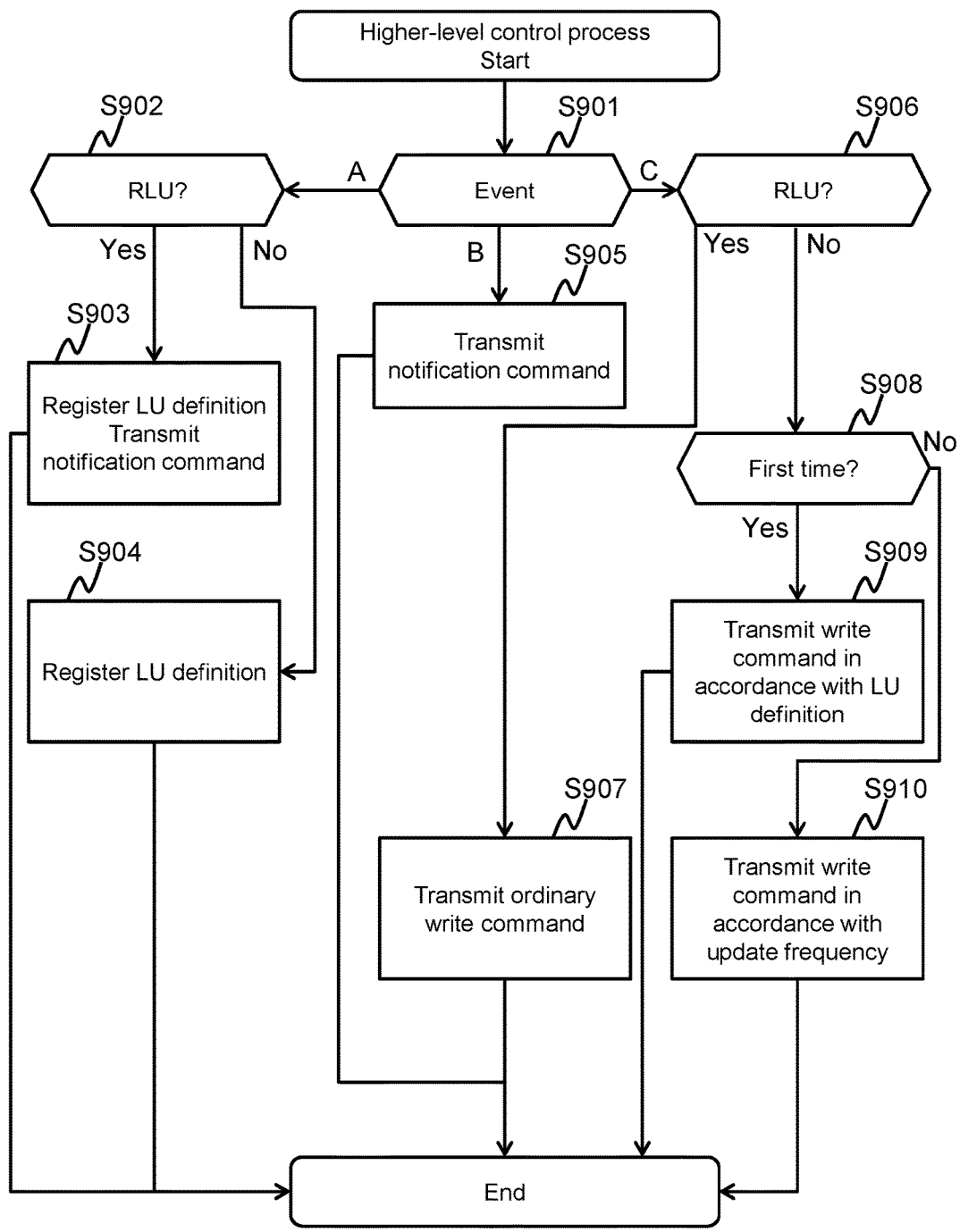
FIG. 9 is a flow chart showing a higher-level control process performed by a storage controller.

FIG. 9 is a flow chart showing a higher-level control process performed by the storage controller 20. This process is performed by, for example, the RAID control program 251.

When an LU definition is input (S901: A) and an input LU type is RLU (S902: Yes), the storage controller 20 registers the input LU type and the input LU definition in the LU management information 253 and, at the same time, transmits a notification command including the input LU definition or update level information indicating an update frequency level determined from the input LU definition and a logical address range corresponding to a target LU of the input LU definition to the FMPK 30 (S903). On the other hand, when an LU definition is input but an input LU type is VLU (S902: No), the storage controller 20 registers the input LU type and the input LU definition in the LU management information 253 but does not transmit a notification command (S904). This is because update level information is included in a write command in the case of a VLU. On the other hand, update level information is not included in a write command in the case of an RLU.

When the storage controller 20 detects a change in a logical address range attribute (for example, an attribute of a real chunk, an LU definition, or the like) (S901: B), the storage controller 20 transmits a notification command including update level information indicating the changed logical address range attribute or an update frequency level determined from the attribute of the logical address range to the FMPK 30 corresponding to a logical address range related to the changed logical address range attribute (S905). When a write command is no longer generated by the storage controller 20 for a specific logical address range, the FM controller 32 is unable to learn that the update frequency level of the logical address range has been lowered from hot to cold. However, since the change in the logical address range attribute triggers an issuance of a notification command, the FM controller 32 is able to learn that the update frequency level of the logical address range has been lowered from hot to cold.

When the storage controller 20 transmits a write command with respect to the RLU to the FMPK 30 (S901: C and S906: Yes), the storage controller 20 transmits an ordinary write command specifying a write destination LBA to the FMPK 30 (S907).

When the storage controller 20 transmits a write command with respect to a real chunk allocated to a virtual chunk of a VLU to the FMPK 30 (S901: C and S906: No), the storage controller 20 determines whether or not the virtual chunk is to be written into for the first time (S908). A virtual chunk in which a write occurs for the first time is an example of a virtual chunk with a prescribed attribute. Another example of a virtual chunk with a prescribed attribute may be a virtual chunk for which a measurement of an update frequency has just been started and which corresponds to an update frequency of low reliability.

When a result of the determination in S908 is positive (S908: Yes), the storage controller 20 transmits a write command which specifies a write destination LBA for a real chunk allocated to the virtual chunk to the FMPK 30 (S909). Update level information included in the write command indicates an LU definition of the VLU or an update frequency level determined based on the LU definition. A virtual chunk with a prescribed attribute is a virtual chunk of which an update frequency is unknown or a virtual chunk of which the update frequency is unreliable. With respect to a real chunk allocated to such a virtual chunk, the FMPK 30 can be notified of an LU definition of the VLU or an update frequency level determined based on the LU definition. Accordingly, a physical block having an appropriate degradation level can even be allocated to an LBA with respect to a real chunk allocated to such a virtual chunk.

When a result of the determination in S908 is negative (S908: No), the storage controller 20 executes S910, that is, transmits a write command in accordance with the update frequency. Specifically, if the update frequency of a corresponding virtual chunk is "intermediate", the storage controller 20 transmits an ordinary write command to the FMPK 30, but if the update frequency of the corresponding virtual chunk is "high" or "low", the storage controller 20 transmits a write command including update level information to the FMPK 30. As described earlier, the update level information included in the write command indicates an update frequency of a virtual chunk to which the real chunk is allocated or an update frequency level determined from the update frequency. The update frequency of the virtual chunk is identified from the tier management information 254. According to this process, the transmission of a write command doubles as a notification of latest update level information. Therefore, the FMPK 30 can be notified of the latest update level information without transmitting a command for the express purpose of notifying update level information to the FMPK 30. In addition, while an update frequency may vary for each virtual chunk, since update level information is to be notified in units of real chunks, data of a same update frequency level is expected to be aggregated in a physical block to be allocated.

Figure 10:
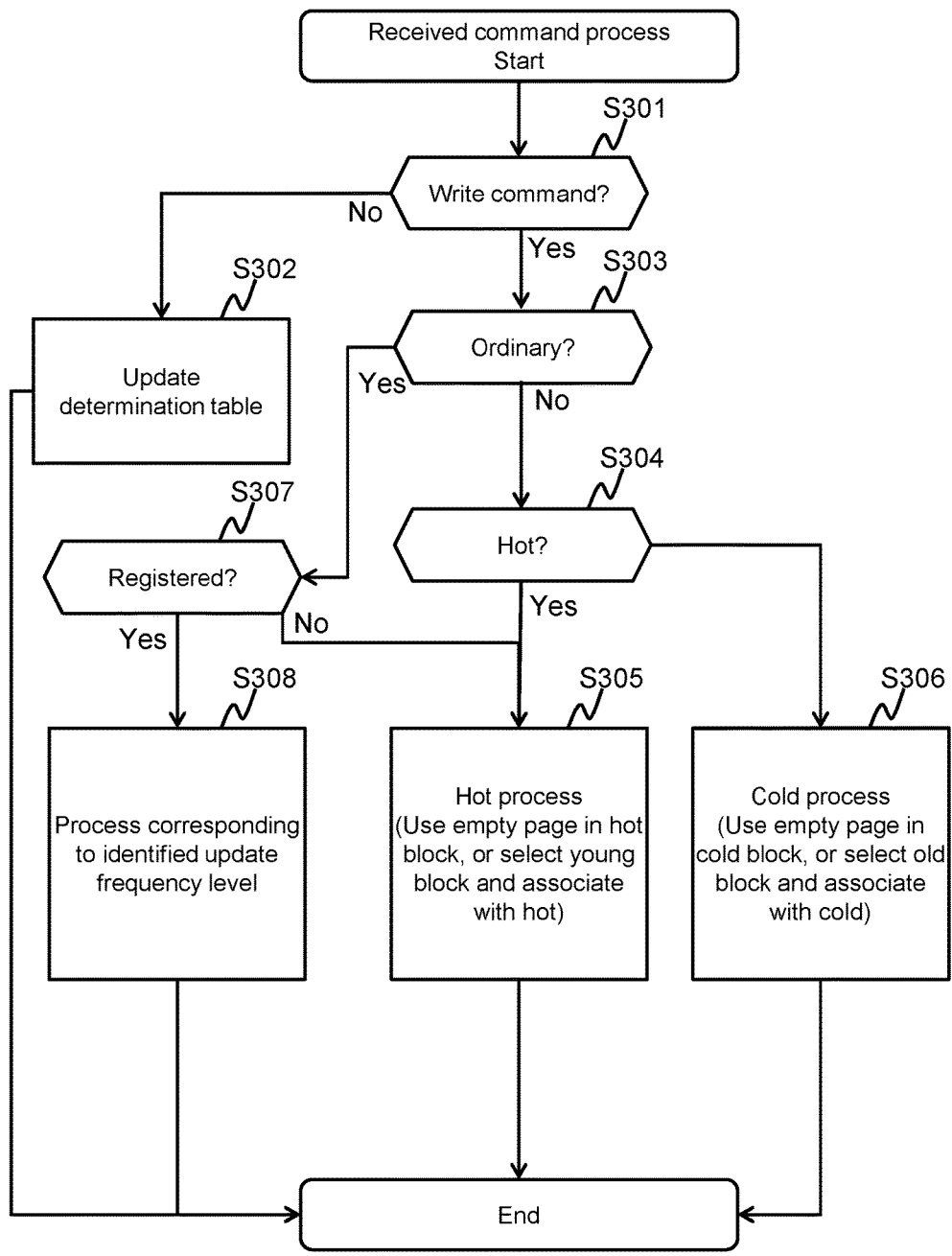
FIG. 10 is a flow chart showing a received command process performed by an FM controller.

FIG. 10 is a flow chart showing a received command process performed by the FM controller 32. This process is performed by, for example, the FM control program 442. While the received command process is a process performed on a received command, the received command is a write command or a notification command. As described earlier, a notification command is a command issued by the storage controller 20 when an LU definition is input to the storage controller 20 or when a change in a logical address range attribute is detected by the storage controller 20.

When the FM controller 32 receives a notification command (S301: No), the FM controller 32 registers a logical address range and an update frequency level identified from the notification command in the determination table 452 (S302). As will be described later, the determination table 452 is used in a process of an ordinary write command and, as a result, a process corresponding to the registered update frequency level (a hot process or a cold process) is performed. Accordingly, a physical block having a degradation level corresponding to an update frequency level suitable for the LU definition input from the user can be allocated to the logical address range.

When the FM controller 32 receives a write command (S301: Yes), the FM controller 32 determines whether or not the write command is an ordinary write command (S303).

When a result of the determination in S303 is negative (S303: No) or, in other words, when the write command is a write command including update level information, the FM controller 32 determines whether or not an update frequency level of "hot" is identified from the update level information in the write command (S304).

When a result of the determination in S304 is positive (S304: Yes), the FM controller 32 performs a hot process. In the hot process, for example, the FM controller 32 determines whether or not a physical block has already been allocated to a logical address range (an LBA) specified in the write command using, for example, logical-physical translation information in the FM management information 451. When already allocated, the FM controller 32 writes data into an empty page of a block being written associated with the update frequency level of "hot" (a block being written corresponding to the block management entry 800 including the update frequency level of "hot"). Accordingly, hot data can be aggregated into a physical block associated with hot. On the other hand, when not yet allocated, the FM controller 32 allocates a young block to a logical address range identified from the write command and records the update frequency level of "hot" in the block management entry 800 of the allocated young block. Which physical block is a young block can be identified from block management information 453.

When a result of the determination in S304 is negative (S304: No), the FM controller 32 performs a cold process. In the cold process, for example, the FM controller 32 determines whether or not a physical block has already been allocated to a logical address range (an LBA) specified in the write command using, for example, logical-physical translation information in the FM management information 451. When already allocated, the FM controller 32 writes data into an empty page of a block being written associated with the update frequency level of "cold" (a block being written corresponding to the block management entry 800 including the update frequency level of "cold"). Accordingly, cold data can be aggregated into a physical block associated with cold. On the other hand, when not yet allocated, the FM controller 32 allocates an old block to a logical address range identified from the write command and records the update frequency level of "cold" in the block management entry 800 of the allocated old block. Which physical block is an old block can be identified from block management information 453.

When a result of the determination in S303 is positive (S303: Yes) or, in other words, when the write command is an ordinary write command, the FM controller 32 refers to the determination table 452 and determines whether or not a logical address range (an LBA) specified in the ordinary write command is registered in the determination table 452 (S307).

When a result of the determination in S307 is positive (S307: Yes), the FM controller 32 identifies an update frequency level corresponding to the logical address range from the determination table 452 and performs a process corresponding to the identified update frequency level (S308). When the identified update frequency level is "hot", a hot process is performed, but when the identified update frequency level is "cold", a cold process is performed.

When a result of the determination in S307 is negative (S307: No), a hot process is performed.

This concludes the description of the received command process. Moreover, when data is written into a top empty page of an allocated physical block, the FM controller 32 records a write start time point in the block management entry 800 corresponding to the physical block, but when data is written into an end empty page of an allocated physical block, the FM controller 32 records a write end time point in the block management entry 800 corresponding to the physical block.

As described above, the FM controller 32 processes a command received from the storage controller 20. The FM controller 32 is capable of learning about an update frequency level of a logical address range from the command from the storage controller 20.

In other words, the FM controller 32 cannot learn about an update frequency level in accordance with management of the storage controller 20 unless the FM controller 32 receives a command from the storage controller 20. Therefore, for example, when a state where write does not occur with respect to a certain logical address range continues, the FM controller 32 cannot learn that the update frequency level has changed from hot to cold. In the present embodiment, while a notification command which is separate from a write command is used, the transmission of the notification command is triggered by the detection of a change in a logical address range attribute. Therefore, unless a change in the logical address range attribute is detected, a notification command is not transmitted and the FM controller 32 cannot learn about a change in the update frequency level.

In consideration thereof, in the present embodiment, as described earlier, with the internal process performed by the FM controller 32 as a trigger, an approximate update frequency level of data in a migration source physical block in the internal process is determined and the appropriate update frequency level is associated with a migration destination physical block.

While an example in which the FM controller 32 receives an update frequency level from the storage controller 20 has been described above, alternatively, the FM controller 32 may be configured to determine an update frequency level for a range of write target logical addresses upon receiving a write command. For example, receiving a write command means that there is a high possibility of the data being subsequently accessed. Therefore, the FM controller 32 may set hot for an address range specified by the write command.

While the use of a notification command requires an interface for using the notification command, in this case, an update frequency level can be determined at a stage when a general write command is received.

Figure 11:
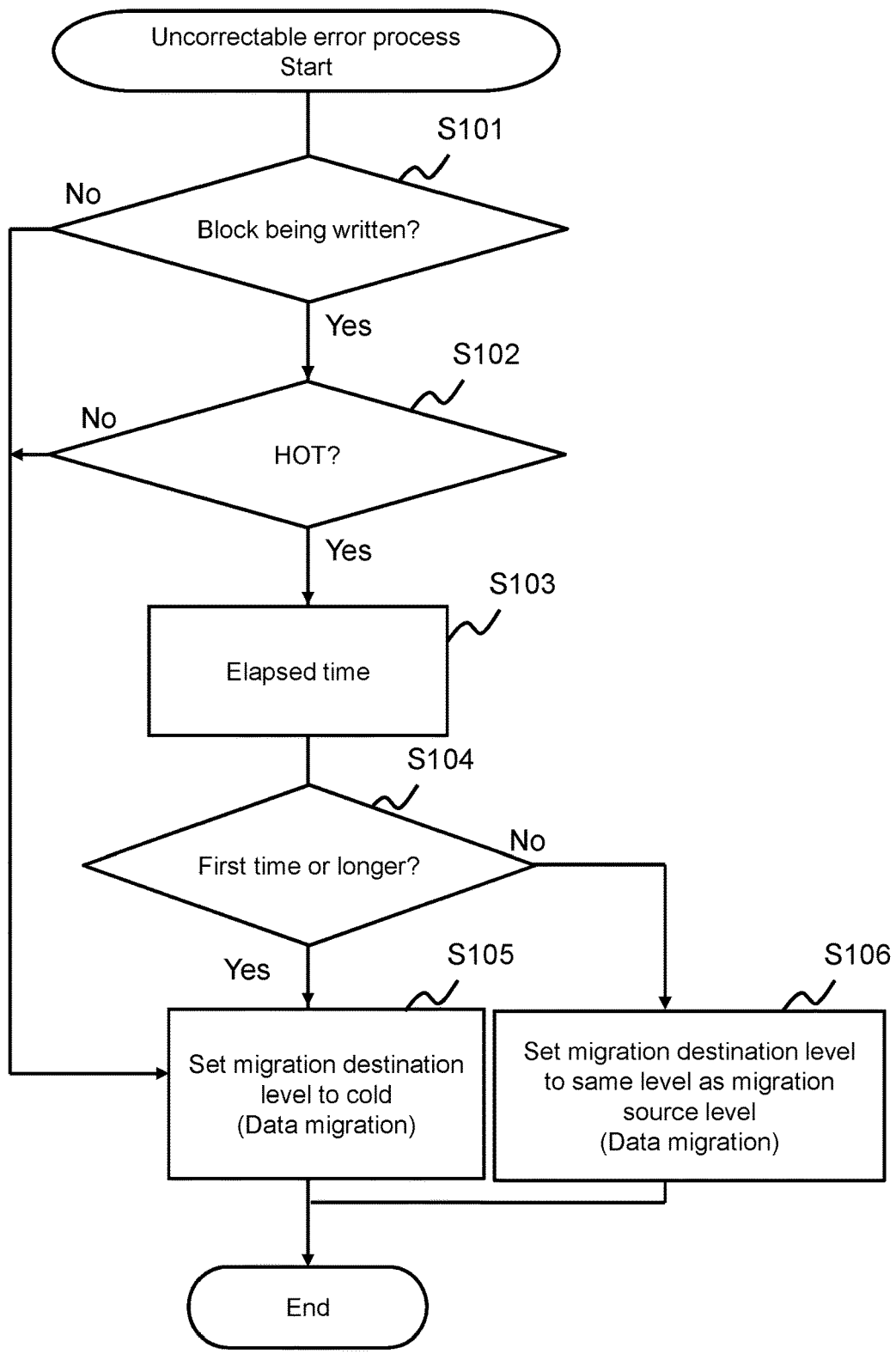
FIG. 11 is a flowchart showing an uncorrectable error process.

FIG. 11 is a flowchart showing an uncorrectable error process.

An uncorrectable error process refers to a process which is performed (started) with a detection of an uncorrectable error of data as a trigger.

The FM controller 32 determines whether or not a physical block that is a read source (a migration source physical block) of data in which an uncorrectable error has been detected is a block being written (S101). A block being written refers to a physical block in which data is written partway through a physical page but not to a last physical page. A block being written can be identified from an entry in which a write start time point is recorded but a write end time point is not recorded.

When a result of the determination in S101 is negative (S101: No), the FM controller 32 sets a migration destination level (an update frequency level to be associated with a physical block to be a migration destination of data from a migration source physical block) to cold regardless of a migration source level (an update frequency level associated with a migration source physical block) (S105). In an FM (flash memory), generally, the number of error bits increases with a lapse of time from writing data, and data of which the number of error bits has increased to an uncorrectable number is uncorrectable error data. In other words, an occurrence of an uncorrectable error means that a long time has elapsed and, conceivably, a cold state exists. Therefore, in S105, cold is configured as the migration destination level. Specifically, since the migration destination level is "cold", the FM controller 32 selects an old block (for example, an empty old block or an old block which is already associated with cold) as a migration destination physical block, migrates data to the old block from the migration source physical block, and records an update frequency level of "cold" in the block management entry 800 of the old block.

When a result of the determination in S101 is positive (S101: Yes), the FM controller 32 determines whether or not the migration source level is hot (S102). When a result of the determination in S102 is negative (S102: No), S105 is performed. This is because, when the migration source physical block is a block being written and an update frequency level thereof is cold, an update frequency level of a migration destination physical block conceivably remains at cold.

When a result of the determination in S102 is positive (S102: Yes), the FM controller 32 acquires an elapsed time from the write start time point (a difference between the write start time point and the current time point) of the migration source physical block (S103), and determines whether or not the acquired elapsed time is equal to or longer than a first time (a first threshold) (S104). Moreover, as will be described later, in addition to the uncorrectable error process, internal processes include an internal data migration process that is a process of migration between physical blocks which is triggered by an event other than an uncorrectable error. While a migration destination level is determined in the internal data migration process based on whether or not a second time or longer has elapsed since writing of data in a prescribed area of a physical block (a migration source candidate), the first time (a first certain time) used in S104 is shorter than the second time (a second certain time).

When a result of the determination in S104 is positive (S104: Yes), S105 is performed. This is because, despite hot being associated with the migration source physical block, the elapsed time being equal to or longer than the first time means that the physical block is a block which has not been updated for a while.

When a result of the determination in S104 is negative (S104: No), the FM controller 32 sets the migration destination level to "hot" which is the same level as the migration source level (S106). In other words, S104: No signifies a case where an uncorrectable error occurs despite the elapsed time being shorter than the first time. With respect to such a state, there is merit in maintaining the migration destination level to hot which is the same level as the migration source level. Specifically, a block being written has a characteristic where errors are more likely to occur as compared to a physical block that is not a block being written. This is not dependent on an actual state of the block being written being hot or cold. Therefore, even when an uncorrectable error is detected, the state of the block being written is not necessarily cold. An uncorrectable error may be detected in a block being written even through an elapsed time from writing of data into a prescribed area of the block being written is shorter than the first time. In such a case, an update frequency level of a block that is a migration destination of data from the block being written is set to "hot". In S106, specifically, since the migration destination level is "hot", the FM controller 32 selects a young block (for example, an empty young block or a young block which is already associated with hot) as a migration destination physical block, migrates data to the young block from the migration source physical block, and records an update frequency level of "hot" in the block management entry 800 of the young block.

After data migration is completed, the FM controller 32 erases the data from the migration source physical block and, accordingly, updates the number of erasures and erases the update frequency level in the block management entry 800 corresponding to the physical block.

Figure 12:
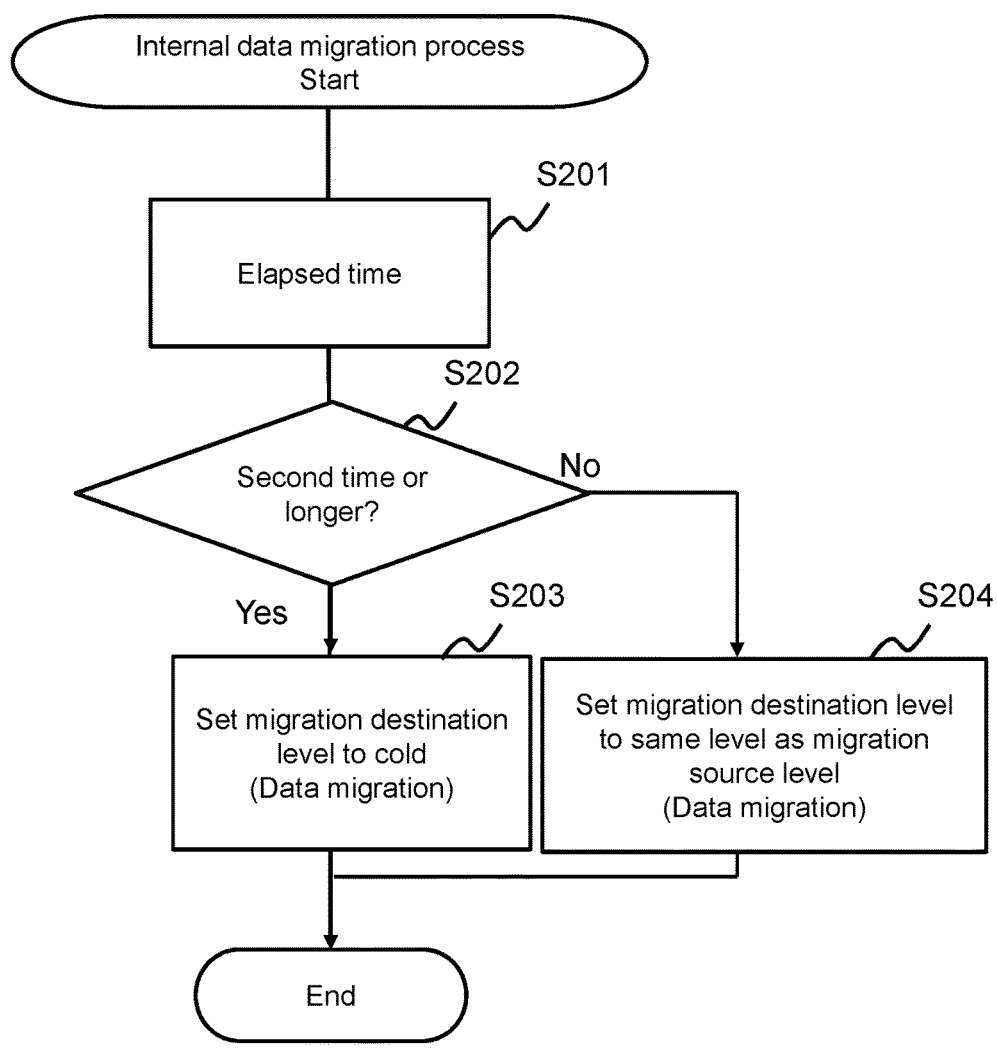
FIG. 12 is a flow chart showing an internal data migration process.

FIG. 12 is a flow chart showing an internal data migration process.

As described earlier, the internal data migration process refers to a process of migrating data between physical blocks with a trigger other than an uncorrectable error. Examples of the internal data migration process include a refresh process and a reclamation process. A "refresh process" refers to a process of reading data (particularly, valid data) from a physical block, performing error correction on the data, and migrating the error-corrected data to a different physical block (for example, a physical block with a smaller number of PEs than a migration source physical block). In the refresh process, the migration source physical block may be a physical block in which a certain time (a second time) or more has elapsed since writing of data into a prescribed area (for example, a top physical page) or a physical block in which an error of a prescribed type has been detected a prescribed number of times or more. A "reclamation process" refers to a process of migrating valid data in a migration source physical block (a physical block that is a reclamation target) to a different physical block and erasing data from the migration source physical block. In the reclamation process, the migration source physical block may be a physical block of which an invalid data rate has exceeded a prescribed threshold. In addition, a start of the reclamation process may be triggered by the number of physical blocks (empty blocks) not allocated to an LBA falling below a prescribed threshold (an occurrence of a shortage of empty blocks).

The FM controller 32 does not determine whether or not a migration source physical block (a physical block that is a target of the internal data migration process) is a block being written.

The FM controller 32 refers to the block management entry 800 of the migration source physical block and acquires an elapsed time from the write start time point of the migration source physical block (S201), and determines whether or not the elapsed time is equal to or longer than a second time (a second threshold) (S202).

When a result of the determination in S202 is positive (S202: Yes), the FM controller 32 sets a migration destination level to cold (S203). This is because data in the migration source physical block has not been updated for a while. Details of S203 are similar to those of S105. Moreover, when a multiple of stages of the update frequency level of "cold" are provided, the FM controller 32 may set the migration destination level to cold that is less colder than the coldest cold when S202: Yes. This is because, in reclamation, a physical block in which a certain time has elapsed since the completion of write tends to be selected as a migration source and a certain amount of invalid pages conceivably exist in the migration source physical block.

When a result of the determination in S202 is negative (S202: No), the FM controller 32 sets the migration destination level to a same level as the migration source level (S204). Details of S204 are similar to those of S106. However, in S204, the migration source level may sometimes be "hot" or may sometimes be "cold".

According to the embodiment described above, in order to determine whether a physical block is hot or cold, at least one of a presence or absence of an occurrence of an uncorrectable error and an elapsed time from writing of data into a prescribed area (for example, a top physical page) of a physical block is used. Therefore, an access frequency need not be monitored in order to make a determination of hot/cold for both a logical address range and a physical area (a physical block or a physical page). Monitoring access (read/write) frequency requires providing a counter for each logical address range or each physical area and, every time an access occurs, updating the counter corresponding to the logical address range or the physical area that is the access destination. As a result, load is high. According to the present embodiment, a determination of hot/cold can be made without applying such a load.

The embodiment described above merely represents an example for illustrating the present invention, and it is to be understood that the scope of the present invention is not limited to the embodiment. It will be obvious to those skilled in the art that the present invention can be implemented in various other modes without departing from the spirit of the present invention. For example, the FMPK 30 may be coupled to a computer such as the host 10 instead of being mounted to the storage apparatus 300. In this case, the higher-level apparatus 20 may be a computer such as the host 10.

REFERENCE SIGNS LIST

20 Higher-level apparatus (storage controller)
30 FMPK

The invention claimed is:

1. A nonvolatile memory device coupled to a higher-level apparatus transmitting a read command and a write command, the nonvolatile memory device comprising:
   a nonvolatile memory including a plurality of physical blocks; and
   a memory controller configured to execute a read process of reading data from the nonvolatile memory in response to the read command, a write process of writing data to the nonvolatile memory in response to the write command, and an internal process which is a different process from the read process and the write process and which involves migrating data between physical blocks,
   the memory controller being configured to receive a logical address range from the higher-level apparatus and select, based on an update frequency level which is identified with respect to the logical address range, a physical block to be allocated to the logical address range from among the plurality of physical blocks, and
   the memory controller being configured to determine, in the internal process, whether to set a migration destination level that is an update frequency level of a migration destination physical block to a same level as or a different level from a migration source level that is an update frequency level of a migration source physical block based on whether or not an attribute of the migration source physical block satisfies a prescribed condition, wherein
   each of the physical blocks is composed of a plurality of physical pages,
   the nonvolatile memory is a memory in which data is read and written in page units and erased in block units,
   the update frequency level includes hot which is a level signifying that update frequency is comparatively high and cold which is a level signifying that update frequency is comparatively low, and
   the memory controller is configured to, when the internal process is an uncorrectable error process which is a process performed when the memory controller detects an uncorrectable error:
   determine whether the migration source physical block is a block which is being written in which data is written partway through a physical page but not to a last physical page; and
   determine the migration destination level based on a result of the determination.

2. A storage apparatus comprising:
   a nonvolatile memory device; and
   a higher-level apparatus configured to transmit a read command and a write command to the nonvolatile memory device,
   the nonvolatile memory device including:
      a nonvolatile memory including a plurality of physical blocks; and
      a memory controller configured to execute a read process of reading data from the nonvolatile memory in response to the read command, a write process of writing data to the nonvolatile memory in response to the write command, and an internal process which is a different process from the read process and the write process and which involves migrating data between physical blocks,
   the higher-level apparatus being configured to transmit a logical address range to the nonvolatile memory device, the memory controller being configured to select, based on an update frequency level which is identified with respect to a logical address range from the higher-level apparatus, a physical block to be allocated to the logical address range from among the plurality of physical blocks, and the memory controller being configured to determine, in the internal process, whether to set a migration destination level that is an update frequency level of a migration destination physical block to a same level as or a different level from a migration source level that is an update frequency level of a migration source physical block based on whether or not an attribute of the migration source physical block satisfies a prescribed condition, wherein each of the physical blocks is composed of a plurality of physical pages, the nonvolatile memory is a memory in which data is read and written in page units and erased in block units, the update frequency level includes hot which is a level signifying that update frequency is comparatively high and cold which is a level signifying that update frequency is comparatively low, and the memory controller is configured to, when the internal process is an uncorrectable error process which is a process performed when the memory controller detects an uncorrectable error:

determine whether the migration source physical block is a block which is being written in which data is written partway through a physical page but not to a last physical page; and determine the migration destination level based on a result of the determination.

3. The storage apparatus according to claim 2, wherein the memory controller is configured to set the migration destination level to cold when the result of the determination is negative.

4. The storage apparatus according to claim 2, wherein the memory controller is configured to set the migration destination level to hot, which is a same level as the migration source level, when the result of the determination is positive, the migration source level is hot, and a first time or longer has elapsed since writing of data into a top physical page of the migration source physical block.

5. The storage apparatus according to claim 2, wherein the memory controller is configured to set the migration destination level to cold which is different level from the migration source level, when the result of the determination is positive, the migration source level is hot, and a first time or longer has not elapsed since writing of data into a top physical page of the migration source physical block.

6. The storage apparatus according to claim 4, wherein the internal process includes, in addition to the uncorrectable error process, an internal data migration process that is a process of migration between physical blocks which is triggered by an event other than an uncorrectable error, and the memory controller is configured to, when the internal process is the internal data migration process:

determine whether or not a second time or longer has elapsed since writing of data in a prescribed area of the migration source physical block; and set the migration destination level to cold when a result of the determination is positive, the first time is shorter than the second time.

7. The storage apparatus according to claim 2, wherein the update frequency level includes hot which is a level signifying that update frequency is high and cold which is a level signifying that update frequency is low, and the memory controller is configured to, when the internal process is an internal data migration process that is a process of migration between physical blocks which is triggered by an event other than an uncorrectable error:

determine whether or not a certain time or longer has elapsed since writing of data in a prescribed area of the migration source physical block; and set the migration destination level to cold when a result of the determination is positive.

8. The storage apparatus according to claim 2, wherein the logical address range is a logical address range corresponding to a logical unit provided by the higher-level apparatus, the higher-level apparatus is configured to transmit, in addition to the logical address range, update level information indicating an attribute of the logical address range or an update frequency level determined based on the attribute, to the memory controller, the update frequency level of the logical address range is determined by the higher-level apparatus or the memory controller based on at least one of a usage purpose and an access pattern of the logical unit, and at least one of the usage purpose and the access pattern of the logical unit is input to the higher-level apparatus through a user interface and is associated with the logical unit by the higher-level apparatus.

9. The storage apparatus according to claim 2, wherein the higher-level apparatus is configured to allocate a real chunk from a pool composed of a plurality of real chunks to a write destination virtual chunk in a virtual unit composed of a plurality of virtual chunks, the logical address range is a logical address range corresponding to a real chunk, the higher-level apparatus is configured to manage an update frequency for each virtual chunk, the higher-level apparatus is configured to transmit, in addition to the logical address range, update level information indicating an attribute of the logical address range or an update frequency level determined based on the attribute, to the memory controller, and the update frequency level of the logical address range is determined by the higher-level apparatus or the memory controller, based on an update frequency of a virtual chunk to which a real chunk corresponding to the logical address range is allocated.

10. The storage apparatus according to claim 9, wherein a write command from the higher-level apparatus to the nonvolatile memory device includes a logical address range corresponding to the real chunk and update level information indicating an attribute of the logical address range or an update frequency level determined based on the attribute, and the memory controller is configured to determine the update frequency level from the update level information in the write command from the higher-level apparatus.

11. The storage apparatus according to claim 10, wherein the memory controller is configured to manage the number of erasures for each physical block, the memory controller is configured to, when there is no physical block with which an update frequency level is associated and which does not include an empty page,
- select, when hot is identified as an update frequency level from update level information in the received write command, a physical block with a comparatively small number of erasures as a write destination and associate hot with the selected physical block, and
- select, when cold is identified as an update frequency level from update level information in the received write command, a physical block with a comparatively large number of erasures as a write destination and associate cold with the selected physical block, and the memory controller is configured to, when there is a physical block with which an update frequency level is associated and which includes an empty page,
- select, when hot is identified as an update frequency level from update level information in the received write command, an empty page of a physical block with which hot is associated as a write destination, and
- select, when cold is identified as an update frequency level from update level information in the received write command, an empty page of a physical block with which cold is associated as a write destination.

12. The storage apparatus according to claim 10, wherein the higher-level apparatus is configured to, when an update frequency level of a virtual chunk to which a real chunk is allocated is changed, transmit a command, which differs from the write command, to the nonvolatile memory device, and the command includes a logical address range corresponding to the real chunk allocated to the virtual chunk, the update frequency level of which has changed, and update level information indicating a changed update frequency level.

13. The storage apparatus according to claim 2, wherein the memory controller is configured to manage the number of erasures for each physical block, the memory controller is configured to, when the update frequency level is hot, select a physical block with a comparatively small number of erasures as a physical block with which the update frequency level is associated, and the memory controller is configured to, when the update frequency level is cold, select a physical block with a comparatively large number of erasures as a physical block with which the update frequency level is associated.

14. The storage apparatus according to claim 2, wherein the higher-level apparatus is configured to transmit to the memory controller, in addition to the logical address range, update level information indicating an attribute of the logical address range or an update frequency level determined based on the attribute, and the memory controller is configured to identify an update frequency level related to the logical address range from the update level information.

* * * * *